United States Patent [19]
Haczynski et al.

[11] Patent Number: 5,866,874
[45] Date of Patent: Feb. 2, 1999

[54] ROBOTIC WELDING TORCH AND METHOD OF ASSEMBLY

[75] Inventors: Christopher Haczynski, Monee; Glen Jones, Wilmington, both of Ill.

[73] Assignee: Delaware Capital Formation, Inc., Wilmington, Del.

[21] Appl. No.: 633,336

[22] Filed: Apr. 17, 1996

[51] Int. Cl.⁶ .................................................. B23K 9/28
[52] U.S. Cl. ...................................................... 219/137.31
[58] Field of Search ........................... 219/137.31, 125.1, 219/125.11, 136, 137.44, 137.51, 137.63; 901/42

[56] References Cited

U.S. PATENT DOCUMENTS

| | | |
|---|---|---|
| 3,059,098 | 10/1962 | Anderson . |
| 3,265,856 | 8/1966 | Cecil . |
| 3,469,070 | 9/1969 | Bernard et al. . |
| 3,514,570 | 5/1970 | Bernard et al. . |
| 3,544,758 | 12/1970 | dal Molin . |
| 3,576,423 | 4/1971 | Bernard et al. . |
| 3,728,514 | 4/1973 | Bernard et al. . |
| 3,783,233 | 1/1974 | Molin ...................................... 219/136 |
| 4,645,901 | 2/1987 | Scholz et al. . |
| 4,656,329 | 4/1987 | Moerke .................................. 219/136 |
| 5,366,392 | 11/1994 | Raloff et al. . |
| 5,384,447 | 1/1995 | Raloff et al. . |
| 5,451,117 | 9/1995 | Lajoie ...................................... 901/42 |

OTHER PUBLICATIONS

Binzel America, Ltd. brochure dated 1982.
DF Machine Specialities, Inc. catalog for mechanized and Robotic products dated 1982.
DF Machine Specialities, Inc. catalog for MIG,. TIG and SAW welding products available to the public prior to Jan. 16, 1996.
Section of Hobart Brothers Company catalog on water-cooled automatic MIG torches available to the public prior to Jan. 16, 1996.
Instructions for Linde MT–500R MIG Welding Robot Torch dated May. 1983.
Page from Linde MIG Welding Equipment catalog showing Mechanized MIG Torches available to the public prior to Jan. 16, 1996.
OXO Equipment Co, Inc. flyer of MT–500 Machine Automated Water Cooled MIG Gun available to the public prior to Jan. 16, 1996.
Tweco Products, Inc. catalog entitled "Automatic & Robotic MIG Guns & Accessories"dated 1993.
Tweco Products, Inc. brochure identified as Form No. BRO–A/R–93 (8–93) dated 1993.

(List continued on next page.)

*Primary Examiner*—Clifford C. Shaw
*Attorney, Agent, or Firm*—Brinks Hofer Gilson & Lione

[57] ABSTRACT

An improved robotic welding torch includes a conductive inner body tube with first and second receiving areas for receiving a rear housing retaining device and a robotic mount retaining device. A removable robotic mount is slidably positioned over the conductive inner body tube and is preferably held in a fixed axial position by the robotic mount retaining device on one end and a rear housing on the other end. The robotic mount may be replaced with another robotic mount of a desired diameter without dismantling the entire robotic torch assembly. The robotic welding torch may be assembled with an integrated robotic mounting arm in place of the robotic mount so that the torch assembly may be attached directly to a collision sensor on a welding robot. A method of assembling or disassembling a robotic welding torch includes the steps of removably sliding and attaching a rear housing and either a robotic mount or integrated robotic mounting arm by sliding either one onto the inner body tube and against the edge of the rear housing. The robotic mount or integrated mounting arm are removable without the need to completely disassemble the robotic torch through the use of two retaining devices.

25 Claims, 4 Drawing Sheets

OTHER PUBLICATIONS

Tweco catalog entitled "TAM"MIG–Guns and Tri–Just Fixture dated Jan. 1984.

GULLCO brochure for variable Speed Travel Carriage available to the public prior to Jan. 16, 1996.

Bernard ® catalog entitled EZ Feed II MIG Guns available to the public prior to Jan. 16, 1993.

Bernard ® brochure entitled "E–Z Feed 160..."dated Jun. 1, 1985.

Bernard® Operationa Manual entitled "EZ Feed II MIG Guns"Forn No. EZ II–4–5 available to the public prior to Jan. 16, 1996.

Bernard ® catalog entitled "Bernard EZ Feed II MIG Guns"Form No. EZ 11–2–3–350 available to the public prior to Jan. 16, 1996.

Bernard® catalog entitled "Parts Breakdown EZ Feed G, H, & F MIG Guns"Form G–H–F available to the public prior to Jan. 16, 1996.

Bernard® Form No. 160K entitled "160 AMP Gun Adaptor Kit Utilization Chart"dated Dec. 1, 1985.

Bernard® Form No. EZA–2 entitled "Bernard E–Z Feed Adaptor System"dated Oct. 1, 1984.

Bernard® Operations Manual entitled "Water Cooled MIG Guns"Form EZ–WC–1191 dated Nov. 1, 1991.

Bernard® catalog entitled "Clean Air MIG Guns"available to the public prior to Jan. 16, 1996.

Bernard® catalog entitled "Guns and Cables for Robotic and Automatic MIG Applications"Form No. AGS–2, dated Jan. 1, 1986.

Bernard® catalog entitled "Bernard MIG Guns & Cable Assemblies"Form No. SG–S1 dated Jan. 15, 1984.

Page from Tweco Producrs, Inc. catalog entitled "RDM Adapter Plates"dated 1995.

Portion of Tweco Products, Inc. catalog entitled "QTR™ Quick Tube Robotics Torches & Accessories "available to the public prior to Jan. 16, 1996.

Page from Alexannder Binzel catalog showing Robo–End Effector available to the public prior to Jan. 16, 1996.

Alezander Binzel Corp. brochure of Robotic Torch Mount 'A' available to the public prior to Jan. 16, 1996.

Alezander Binzel Corp. brochure of "ATS–CAT"Torch Mount ' available to the public prior to Jan. 16, 1996.

TREGASKISS brochure entitled TOUGH GUN™ available to the public prior to Jan. 16, 1996.

Alexander Binzel Corp. brochure of "Welding Gun Robo 241"available to the public prior to Jan. 16, 1996.

Fig. 1

ROBOTIC WELDING TORCH AND METHOD OF ASSEMBLY

BACKGROUND OF THE INVENTION

The present invention relates to a robotic welding torch. More particularly, the present invention relates to an improved robotic welding torch having easily interchangeable parts and greater functionality in addition to an improved method of assembly.

Robotic welding torches are used in arc welding environments requiring repetitious precision welding, such as mass production of automobiles or automotive parts. Arc welding robots are generally high precision, computer controlled machines containing electric servomotor drives. The welding robots use special interfaces to connect with robotic arc welding equipment. The welding robots typically use an articulating jointed arm to move the attached robotic torch assembly to the desired position. Robotic welding is often used for arc welding parts where the travel distances between welds are large. Robotic torches, such as robotic metal inert gas (MIG) torches, utilize consumable wire electrodes fed from a spool in a separate wire feeder. Also, the robotic torches require a supply of shielding gas and electric current to perform the welding tasks.

The rapid and precise welding applications for which robotic MIG welding torches are used require torch assemblies that are easily assembled and repaired. Robotic welding devices may be subject to heat and wear due to continuous operation. Ease of repair and replacement of the MIG torch can greatly affect the amount of lost production time. Further, the cost of the replacement torch or torch parts can determine the utility of a particular robotic torch design.

Some robotic torch assemblies use a one piece non-removable body tube. In this configuration the entire robotic torch must be disassembled to change the body tube if it becomes damaged or worn. Disassembly of the entire torch is often time consuming and labor intensive. Another type of body tube presently used is a removable, keyed body tube. In this configuration, the body tube can be removed without complete disassembly of the torch, but requires a specific tool to remove. A related type of removable, keyed body tube can be removed without complete disassembly of the torch and without tools, but utilizes a thumb nut that protrudes from the profile of the body of the torch. The thumb nut can break off during use because the raised profile of the nut may impact on items while the torch is moving during welding.

Robotic welding torches often incorporate a robotic arm mount to allow the welding robot to attach to the welding torch. One common configuration is a dedicated mounting diameter that is used as a mounting surface and is an integral part of the torch. Because different welding robots may have interfaces that require different robotic torch diameters, this type of design requires that a welder use separate dedicated robotic welding torches every time each different welding robot is used. A user must then possess and maintain several different robotic welding torches. Some robotic mounts have a changeable diameter, but require complete disassembly of the robotic torch, because the body of the torch is the mounting surface.

Another approach to attaching a robotic welding torch to a welding robot is through the use of a combination arm and coupler. One configuration available is a keyed aluminum arm that is a separate component from the torch. The arm is sometimes manufactured from one piece of aluminum. Several fasteners, such as screws, are typically utilized to retain the robotic torch to a collision sensor on a welding robot. The solid aluminum arms are often heavy, costly, and do not offer electrical feedback protection or collision protection. Other robotic mounting arms use two or more pieces of aluminum where the separate pieces are connected with a screw or nut and bolt, as well as to the collision sensor of the welding robot. The multi-piece design of is type of mounting arm may shift from a desired position, if bumped or jarred, causing damage to the robotic torch or the robot itself during operation.

Accordingly, there is a need for a robotic welding torch assembly having easily removable and attachable parts. A replaceable robotic mount is needed that does not require disassembly of the entire robotic torch and that facilitates changing between welding robots thereby reducing the need to stock multiple robotic torches for different welding robots. A low profile fastening mechanism that reduces accidental loosening and breakage of fasteners is desirable. In addition, a lightweight, electrically insulating integrated robotic mounting arm having an accurate and repeatable mounting capability is needed.

SUMMARY OF THE INVENTION

The present invention provides for an improved robotic welding torch and method of assembly. An embodiment of the present invention includes a robotic welding torch for use with a welding robot. The torch assembly includes a conductive inner body tube with first and second receiving areas for receiving a rear housing retaining device and a robotic mount retaining device. A removable robotic mount is slidably positioned over the conductive inner body tube and is preferably held in a fixed axial position by the robotic mount retaining device on one end and a rear housing on the other end. The robotic mount may be replaced with another robotic mount of a desired diameter without dismantling the entire robotic torch assembly.

According to another aspect of the invention, the robotic welding torch may be assembled with an integrated robotic mounting arm in place of the robotic mount so that the torch assembly may be attached directly to a collision sensor on a welding robot. A preferred removable integrated robotic mounting arm includes a torch mounting sleeve having a non-circular inner circumference. An arm section, integrally attached to the torch mounting sleeve, extends perpendicularly from the torch mounting sleeve. A welding robot mounting sleeve integrally attached to the arm section is positioned opposite the torch mounting sleeve. In other preferred embodiments, the integrated robotic mounting arm is constructed from a thermal set plastic and includes keyed connections to cooperate with the inner body tube and collision sensor and position the robotic welding torch in a predetermined orientation.

Another aspect of the present invention is a method of assembling or disassembling a robotic welding torch. The method includes the steps of attaching a cable fitting to a conductive inner body tube via a power adapter. A user next installs a locking device to securely connect the power adapter to the conductive inner body tube. The user then slides a wave spring and rear housing over the front end of the conductive inner body tube. The user axially secures the rear housing by installing a rear housing retaining ring in an annular groove located along the inner body tube so that the rear housing is maintained in an axial position along the inner body tube. The user may then attach a robotic mount or integrated robotic mounting arm by sliding either one onto the inner body tube and against the edge of the rear housing. The robotic mount or integrated mounting arm is removably axially fixed by installing a second retaining ring in a second annular groove in the inner body tube.

DETAILED DESCRIPTION OF THE PRESENTLY PREFERRED EMBODIMENTS

Figure 1:
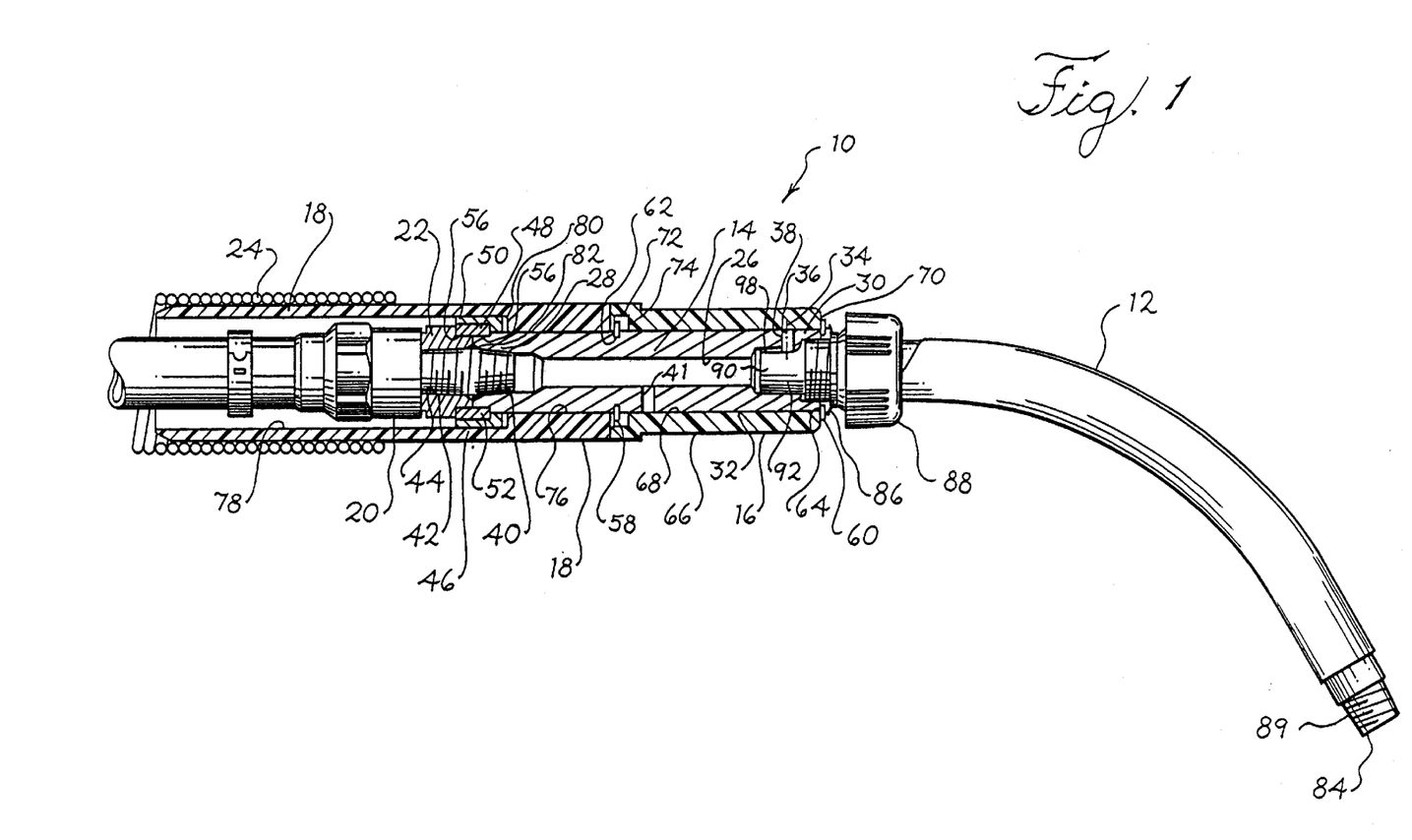
FIG. 1 illustrates a partial cutaway side view of a preferred robotic welding torch.

FIG. 1 illustrates a preferred embodiment of a robotic metal inert gas (MIG) welding torch 10 designed for fast and simple assembly and disassembly. The robotic MIG torch 10 includes a keyed body tube 12 removably attached to a conductive inner body tube 14. The inner body tube 14 is coaxial with a robotic mount 16 that permits a welding robot arm (not shown) to grip the torch 10. The robotic mount surrounds a portion of the length of the inner body tube. A rear housing 18 also surrounds, and is coaxial with, the inner body tube 14. The rear housing 18 contacts the robotic mount 16 and extends to the rear of the torch 10. The rear housing may be manufactured from an electrically insulating material such as a glass filled nylon.

A cable assembly 20 attaches to the inner body tube via a power adapter 22 to supply electric current, shielding gas, and wire electrode material to the torch 10. The cable assembly 20 may be any cable assembly that includes gas, wire electrode, and power lines. The power adapter 22 has a central bore, is made of a conductive material, such as brass, and is dimensioned to connect the cable assembly 20 to the inner body tube 14. In a preferred embodiment, the cable assembly is a unitized cable assembly having a single flexible outer jacket or tube surrounding individual gas, wire, and power lines. Cable assemblies and power adapters appropriate for use with the presently preferred robotic torch 10 are available from DovaTech, Ltd. of Beecher, Ill. A spring strain relief 24 may be fitted around a rear portion of the rear housing 18 to more evenly spread the stresses and strains on the rear housing that may occur as the torch 10 is rotated and moved about by a welding robot. Welding robots suitable for use with the presently preferred robotic torch 10 are commonly available from manufacturers such as Panasonic, Fanuc and others.

The conductive inner body tube 14 has a hollow body with an inner circumference 26 extending axially from the power connection end 28 to the keyed body tube attachment end 30. The conductive inner body tube 14 also preferably includes a non-circularly shaped external circumference 32 extending along at least a portion of the length of the inner body tube. A preferred shape of the external circumference 32 is polygonal, such as a hexagon shape. A suitable conductive material for use in manufacturing the inner body tube is a brass alloy. The hexagonal shaped external circumference, as explained in greater detail below, is useful in forming an anti-rotational fit with the rear housing 18 and robotic mount 16.

Figure 3:
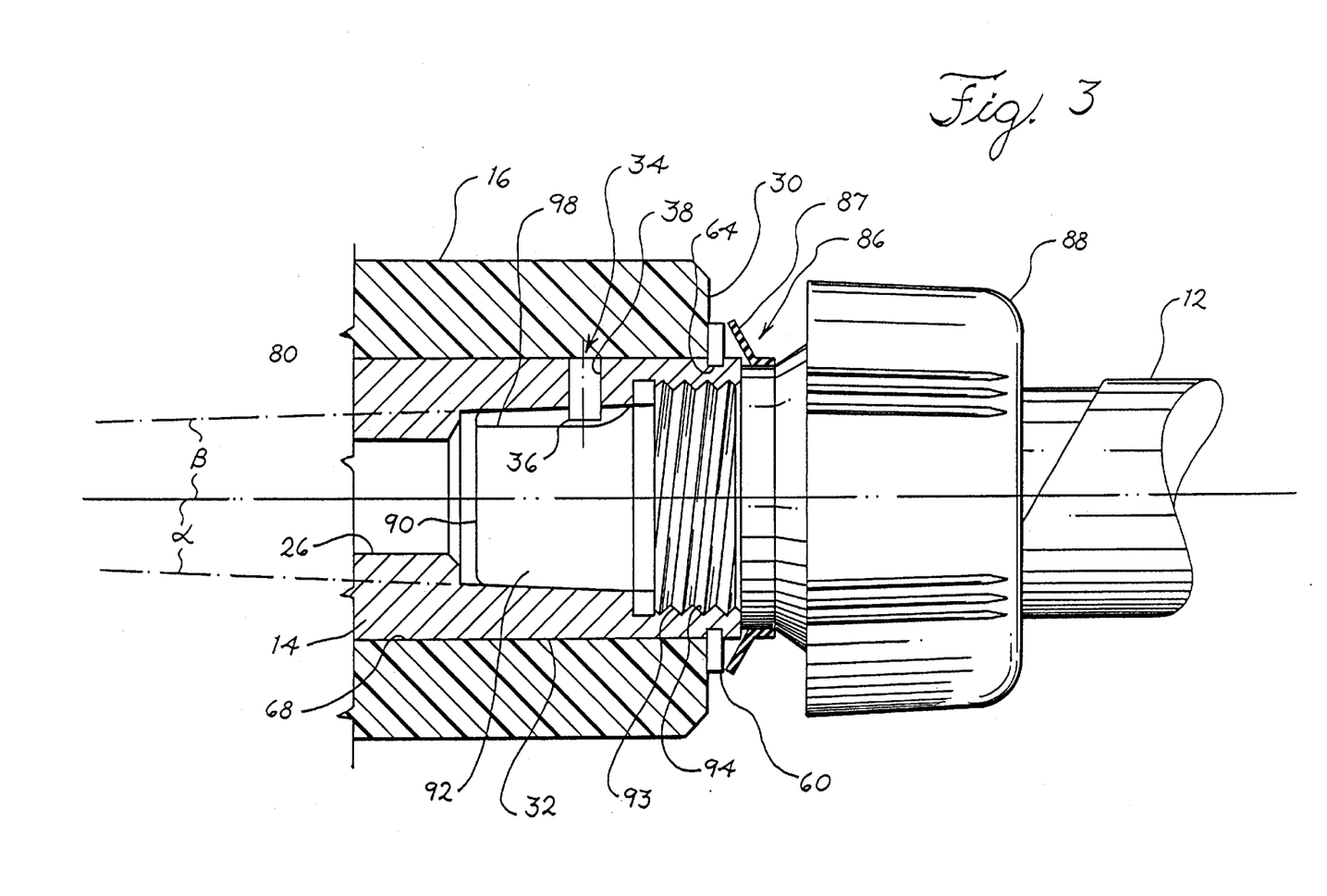
FIG. 3 is a magnified cross-sectional view of the connection of the body tube to the conductive inner body tube of the robotic welding torch assembly of FIG. 1.

According to a preferred embodiment, the inner body tube 14 includes a polarizing element, such as a key 34, positioned in the keyed body tube attachment end 30. The key 34 in the inner body tube 14 cooperates with the keyed body tube 12 to insure that the keyed body tube is attached to the torch 10 in a predetermined orientation. As best shown in FIGS. 1 and 3, the key 34 may be a cylindrical roll pin 36 fixedly positioned in a receiving hole 38 in the inner body tube oriented perpendicular to the longitudinal axis of the conductive inner body tube. The receiving hole extends from the external circumference 32 to the internal circumference 26 of the inner body tube. The roll pin may be frictionally fit in the receiving hole with the use of a press. Alternatively, the roll pin and receiving hole may be threaded. In one preferred embodiment, the roll pin is ⅛ inch in diameter and 3/16 inch long. As will be apparent to those skilled in the art, other means for fabricating a polarizing element, such as replacing the roll pin with a doll pin or using a raised ridge instead of a pin, are contemplated. A second receiving hole 41 is positioned between the first and second receiving areas of the inner body tube. The second receiving hole, as described in greater detail below, may be used in combination with an integrated robotic mounting arm.

Figures 2, 4:
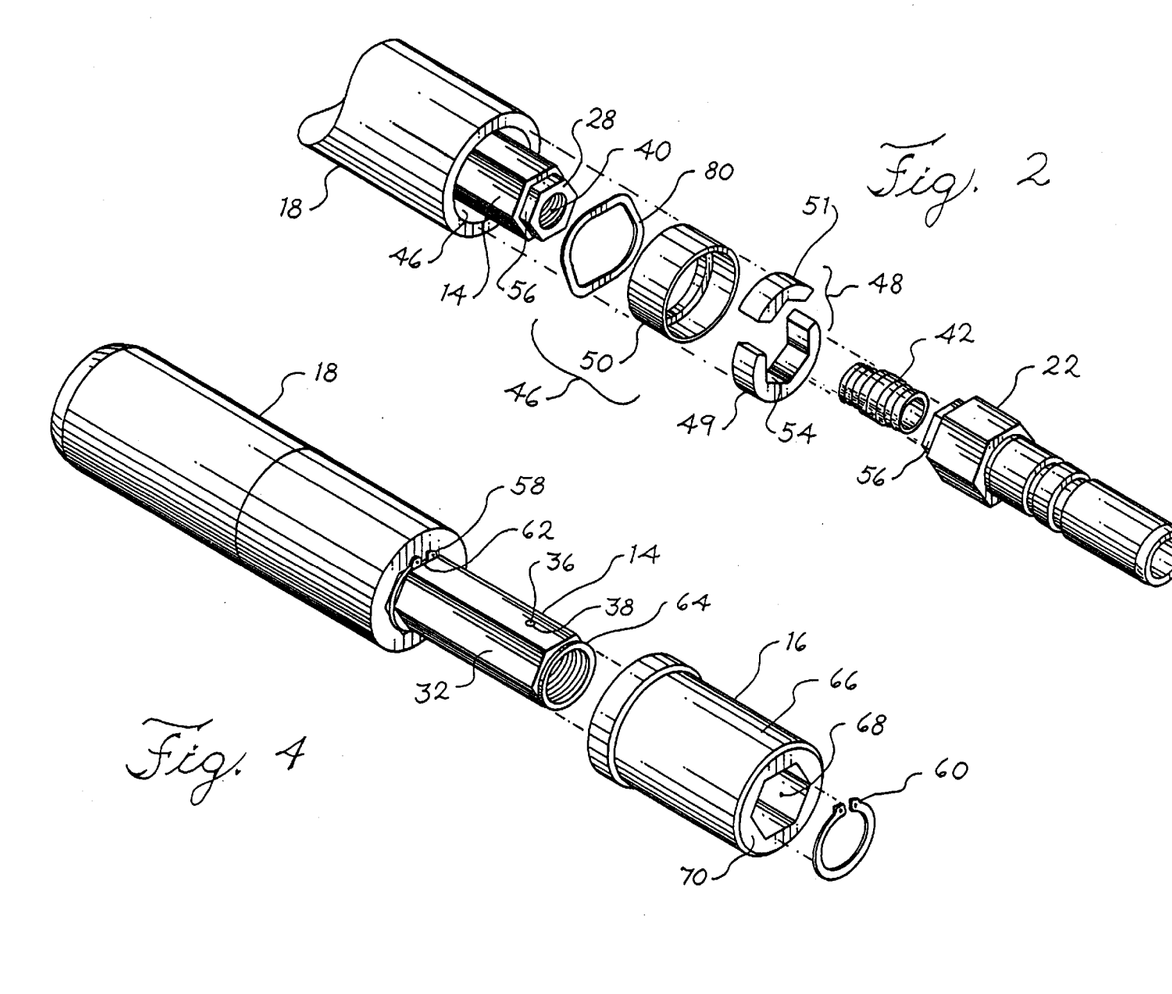
FIG. 2 is an exploded perspective view of the locking mechanism of the robotic welding torch assembly of FIG. 1.
FIG. 4 is an exploded perspective view of a portion of the robotic welding torch of FIG. 1.

The power connector end 28 of the inner body tube preferably comprises an internally threaded area 40 for receiving a threaded connector. The threaded connector, preferably a close nipple 42, also removably connects to the internal threads 44 of the power adapter 22 and is hollow so as to allow passage of wire electrode. A locking mechanism 46 may be used to releasably and securely connect the power adapter 22 and cable assembly 20 to the inner body tube 14. A preferred locking mechanism 46 is made up of a lock ring 48 and a lock ring bushing 50 as shown in FIG. 2. The lock ring 48 preferably comprises two sections 49, 51. The inner circumference 54 of the lock ring 48 is designed to fit over the recessed circumferential area 56 on the connecting ends of the power adaptor 22 and the inner body tube 14. The recessed circumferential area 56 on the power adapter and inner body tube has an anti-rotational shape, such as a hexagonal cross-section, that mates with the portions of the lock ring so The lock ring bushing 50 is slidably movable over the shaft of the inner body tube and is sized to slidably and frictionally fit over the external circumference of the lock ring 48. When a user slides the lock ring bushing 50 over the lock ring 48, the sections 49, 51 of the lock ring are securely held together in the recessed circumferential area by the lock ring bushing.

The conductive inner body tube 14 uses low profile retaining devices to hold the robotic mount and rear housing in place. A rear housing retaining device 58 and robotic mount retaining device 60 are preferably positioned in first and second receiving areas 26, 28 on the conductive inner body tube 14. In one preferred embodiment, the rear housing and robotic mount retaining devices 58, 60 are annular retaining rings and the first and second receiving areas 62, 28 are annular grooves. The retaining ring may be an external snap ring such as those manufactured by Truarc, Inc. and commonly available from other sources. As is shown in FIG. 4, the robotic mount 16 is removable from the torch 10 by simply removing the robotic mount retaining ring 60 from the inner body tube 14 after the keyed body tube 12 has been removed. The retaining rings most preferably have a outer radius that is less than the outer radii of the robotic mount and the rear housing in order to avoid the possibility of being loosened or sheared off by impacts during use.

The robotic mount 16 preferably has a cylindrical external circumference 66 and a non-circular internal circumference 68. The front end 70 of the robotic mount 16 includes a flat area for contacting the robotic mount retaining ring 60. The back end of the robotic mount 16 includes an expanded internal circumference 72 and a recessed portion 74 designed to give clearance to the rear housing retaining ring 58. Thus, the robotic mount is retained in the axial direction by the robotic mount retaining ring 60 on the front end of the torch and at the back end by contact with the rear housing 18 when the robotic torch 10 is assembled. The rear housing retaining ring 58 makes contact with, and holds axially in place, the rear housing 18 when the robotic mount 16 is removed.

As best shown in FIG. 4, the robotic mount 16 is slidably removable in the axial direction while rotationally secured to the conductive inner body tube 14. The anti-rotational fit is accomplished with the use of the non-circular internal circumference 68 on the robotic mount 16 and the matching non-circular outer circumference 32 of the conductive inner body tube 14. In one preferred embodiment, the external circumference 32 of the body tube 14 and the internal circumference 68 of the robotic mount 16 are hexagonal. The robotic mount is preferably constructed of a heat resistant, thermal set plastic to improve electrical isolation between the inner body tube and a welding robot. One suitable material is DIALLYL ORTHO-PHTHALATE manufactured by Cosmic Plastics Incorporated. As will be seen by those skilled in the art, other matching shapes for internal and external circumferences may be used to form an anti-rotational connection between the inner body tube and robotic mount.

An advantage of the presently preferred robotic mount is that a user may simply remove the robotic mount and replace it with another having an outer diameter appropriate for mounting in a welding robot having a predetermined mounting interface diameter. A single robotic welding torch may then be reused in several different welding robots. The presently preferred robotic mount may also be used with robotic plasma or robotic tungsten inert gas (TIG) torches.

Referring again to FIG. 1, the rear housing 18 encircles at least a portion of the conductive inner body tube 14 and extends towards the rear of the torch 10 to cover the power adaptor 22 and cable assembly 20. Similar to the robotic mount 16, the rear housing 18 has a hollow body and forms an anti-rotational fit with the inner body tube 14 with its non-circular, and preferably hexagonal, first inner circumference 76. The rear housing also includes a second inner circumference 78 designed to slidably fit over a locking mechanism 48 connecting the conductive inner body tube 14 with a power adaptor 22. The second inner circumference 46 of the rear housing 18 allows clearance around the power adaptor 22 and cable assembly 20 that extend axially through the rear housing.

When assembled, and in locked positioned, the locking mechanism 46 prevents the power adaptor 22 from rotating with respect to the inner body tube thereby maintaining a good electrical contact between the power adaptor 22 and the inner body tube 14. The locking mechanism 46 also prevents damage to the threads of the inner body tube, power adaptor, and close nipple 42. A spring, preferably an annular wave spring 80, abuts the lock ring bushing 50. A suitable wave spring is available from Smalley Steel Ring Co. and other manufacturers.

The wave spring 80 encircles the inner body tube and is positioned between the bottom of the lock ring bushing 50 and an annular wall 82 created by the junction of the first and second inner circumferences 76, 78 of the rear housing. The wave spring 80 takes up any excess slack between the components assembled axially along the inner body tube 14. Specifically, the wave spring 80 acts as a tensioning device to hold the rear housing 18 against the robotic mount 16 thereby holding the robotic mount firmly against the robotic mount retaining ring 60.

Referring again to FIG. 1, a preferred keyed body tube 12 is shown. The body tube 12 is composed of an inner element, made of a conductive metal such as copper, and an outer element, made of a metal such as brass. An insulating element, made of an appropriate material such as high temperature TEFLON, nylon, or other similar material, is disposed between the inner and outer elements. The insulating element prevents electrical current from flowing from the inner element to the outer element. The body tube 12 may be straight or bent to a desired angle for facilitating the welding process.

The keyed body tube has a distal end 84 opposite to the end of the body tube 12 connected to the end fitting 86. A contact tip (not shown) may be attached to the distal end 84 of the body tube 12 at the threaded portion 89. A locking nut 88 is disposed around the body tube 12 adjacent to the end fitting portion of the body tube 12. A central bore extends along the axial length of the body tube. The bore is dimensioned for accepting a replaceable jumper liner (not shown). A suitable body tube and jumper liner that may used to is disclosed in Raloff et al., U.S. Pat. No. 5,384,447 issued Jan. 24, 1995, the entire disclosure of which is incorporated by reference herein.

A proximal end 90 of the end fitting 86 includes a tapered portion 92 whose outer surface defines an angle $\alpha$ with respect to a longitudinal axis, represented by dotted line in FIG. 3. In the illustrated embodiment, the angle $\alpha$ measures about 2 degrees. The threads on the threaded portion 93 of the keyed body tube connection end 30 are mateable with complementary male threads on a threaded portion 94 of the end fitting 86 to releasably join the end fitting to the body tube. The threads define a thread profile common to the similar structures on other welding apparatuses available from DovaTech, Ltd. of Beecher, Ill. This facilitates interchangeability of the embodiments of the present invention with existing welding equipment. The male connector, or tapered portion 80, of the keyed body tube is designed to removably fit into a female connector, or tapered bore 82, in the conductive inner body tube 14. The inner surface of the tapered bore 80 defines an angle $\beta$ with respect to the longitudinal axis, shown in FIG. 3, which measures about 2.5 degrees. It is to be noted that there is an angular differential, measuring about 0.5 degrees, between the angle $\alpha$ and the angle $\beta$. The precise measure of this differential and the angles $\alpha$ and $\beta$ is subject to usual manufacturing tolerances. This differential facilitates removal of the body tube from the end fitting, thereby providing for relatively quick change of the body tube and the jumper liner without the need of tools.

The keyed body tube 12 includes a substantially cylindrical portion located distally of the tapered portion 80 and coaxial with the threaded portion 94. The locking nut 76 is located around the cylindrical portion. In order to positively locate and retain a locking nut about the cylindrical portion, a snap ring is attached to the outer diameter surface of the cylindrical portion to limit movement of the locking nut in one direction. The locking nut, as more fully described in U.S. Pat. No. 5,384,447, has limited axial movement so that joinder of the tube to the conductive inner body tube is facilitated, and the locking nut is free to rotate about the keyed body tube. Thus, the body tube can be releasably joined to the conductive inner body tube without the aid of tools. In particular, the threads on the locking nut are engageable with threads on the end fitting by hand.

To facilitate this manual joining of the inner body tube to the keyed body tube, the locking nut is made up of an inner element and a hand nut or outer element. The inner element is formed from a metal such as a brass material and is constructed substantially similarly to the locking nuts of the prior art. The outer element is formed of an electrically insulating plastic material which can withstand the operating temperatures of the welding gun, approximately 390° F., and can hold at least 8 foot-pounds of torque. A preferred material for the outer element is Glastic 1412AD (black) which is available from Glastic, Inc. A grommet 87 made of an insulating material such as rubber or vinyl helps to insulate a user from accidental contact with the conductive inner body tube and conductive portion of the keyed body tube when attaching or detaching the keyed body tube.

In a preferred embodiment, the keyed body tube 12 includes a keyway 98 extending longitudinally along substantially the length of the tapered portion 92 of the proximal end 90 of the keyed body tube 12. The keyway may be a groove or slot for receiving the roll pin 36 extending into the tapered receiving area 80 of the conductive inner body tube. When connected as shown in FIG. 3, the keyway 98 cooperates with the roll pin 36 to require assembly of the keyed body tube and the remainder of the robotic MIG welding torch in a predetermined, or polarized, orientation. The preferred key in the body tube offers repeatability when replacing a new body tube and prevents accidental misassembly of the body tube. In one preferred embodiment, the keyed body tube is a Q-GUN body tube, part no. QT5-45, manufactured by DovaTech, Ltd. which has been modified to include a keyway 98. The keyway may be milled in the tapered portion of the connector using any of a number of existing milling machines.

Figures 5, 6, 7:
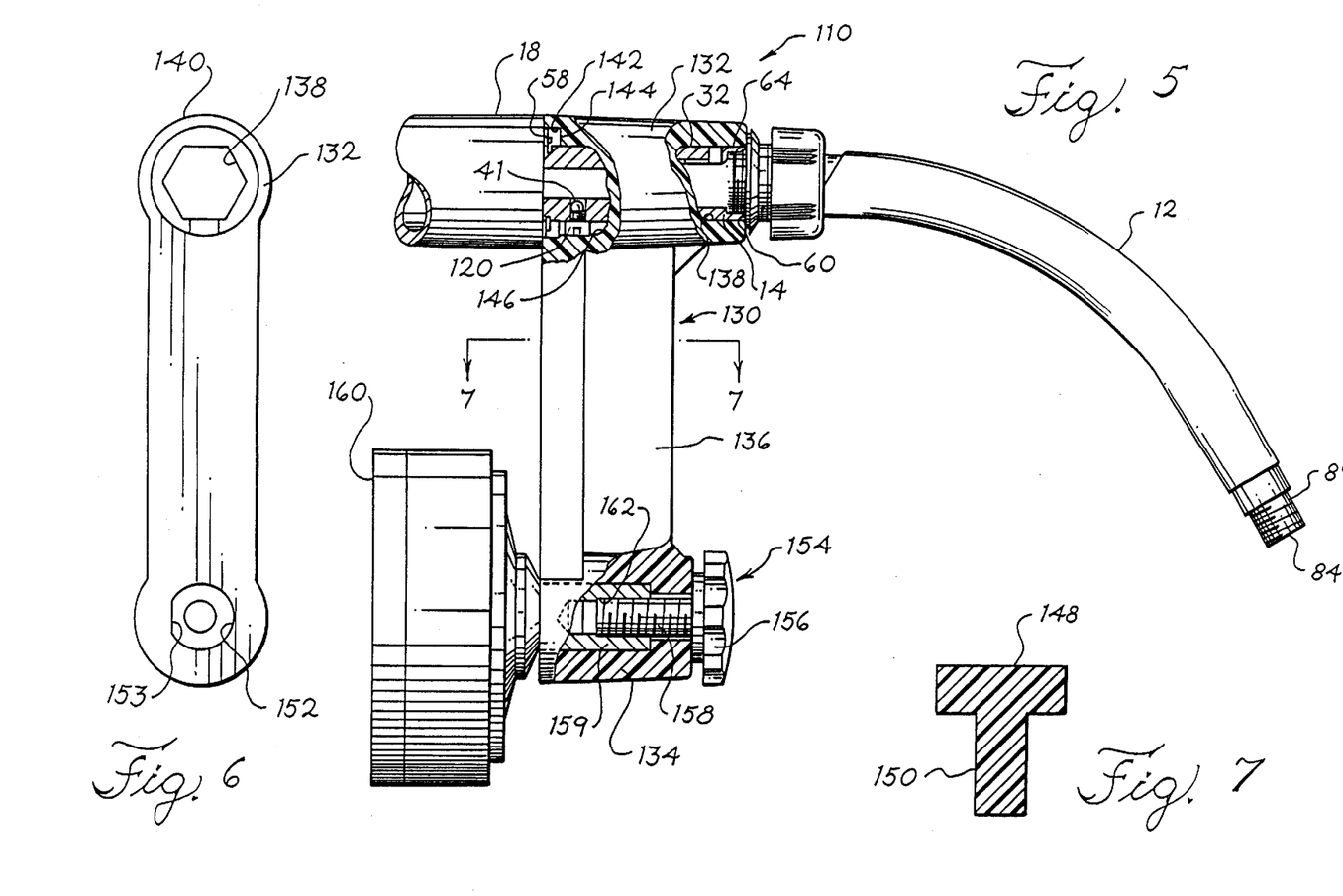
FIG. 5 illustrates a partial cross-sectional side view of a preferred integrated robotic mounting arm attached to a robotic welding torch.
FIG. 6 is a back view of the integrated robotic mounting arm of FIG. 5.
FIG. 7 is a cross-sectional view of a preferred integrated robotic mounting arm taken along line 7—7 of FIG. 5.

FIGS. 5–7 set forth a robotic MIG welding torch assembly according to a second preferred embodiment of the present invention. The robotic torch 110 includes a keyed body tube 12 and rear housing 18 as described above. Additionally, the conductive inner body tube 14 is as described above with the addition of a robotic mount key 120 positioned in the second receiving hole 41. The second receiving hole 41, which is preferably a hollow cylindrical shaft between the inner circumference 26 of the inner body tube and the outer circumference 32 of the inner body tube, is sized to receive a key 120, such as a screw or bolt, that protrudes a predetermined distance from the outer circumference 126 of the conductive inner body tube. The key 120 and receiving hole 41 may frictionally fit together, attach via complementary threads on both the key and receiving hole, or may be attached through any of a number of known means. The robotic mount key 120 and receiving hole 41 may be positioned anywhere between the rear housing retaining device 58 and robotic mount retaining device 60.

The robotic MIG welding torch assembly 110 of FIGS. 5–7 also includes an integrated robotic mounting arm 130. The integrated robotic mounting arm includes a welding torch mounting sleeve 132, a welding robot mounting sleeve 134 and an arm 136 extending between, and integral to, the welding torch and welding robot mounting sleeves 132, 134. As best shown in FIG. 6, the welding torch mounting sleeve 132 has a non-circular, and preferably hexagonal-shaped, interior circumference 138 and a circular outer circumference 140. Preferably, the interior circumference 138 of the welding torch mounting sleeve 132 forms an anti-rotational fit with the exterior circumference 32 of the conductive inner body tube 14. The integrated robotic mounting arm 130 is slidably removable in the axial direction in the same manner described for the embodiment of the robotic mount 16 in FIG. 1. Specifically, when assembled the integrated robotic mounting arm slides over the conductive inner body tube and is held in position between the rear housing 18 and the robotic mount retaining ring 60 positioned in the second receiving area 136. As with the removal of the robotic mount, when the integrated mounting arm is removed the wave spring pushes the rear housing against the rear housing retaining ring 58 so that the entire torch 110 does not need to be disassembled. The external surface 140 of the welding torch mounting sleeve 142 is preferably tapered from the portion adjacent the rear housing down towards the keyed body tube connection. An expanded internal circumference 142 and recessed area 144 inside the welding torch mounting sleeve 132 provides clearance over the rear housing retaining ring 58 when the robotic torch 110 is assembled.

Additionally, a keyway 146 designed to cooperate with the key 120 of the conductive inner body tube 14 is preferably a groove or channel cut into the interior circumference 138 of the mounting sleeve 132. By using a key 120 in cooperation with the keyway 146, the integrated robotic mounting arm 130 may be repeatedly mounted onto the conductive inner body tube at a predetermined orientation. The key and keyway ensures repeatability from one installation to the next. Alternatively, the presently preferred keyway 146 may be used with a conductive inner body tube 114 lacking a key and still provide a limited number of orientations with which to align with the conductive inner body tube.

As shown in FIG. 4, the integrated robotic mounting arm 130 includes a arm section 136 integral with the robotic welding torch mounting sleeve 132. Preferably, as best seen in FIG. 7, the arm section 136 has a T-shaped cross-section. The horizontal portion 148 of the T is perpendicular to the axis of the mounting sleeve and the stem, or vertical portion 150, of the T is parallel to the axis of the mounting sleeve. The T-shaped cross-section adds torsional stability and added strength. Rather than requiring a solid cylindrical or rectangular arm, a thinner arm section is possible because the T-shaped cross-section. The arm section 136 may be of any desired length appropriate for use in a given robotic welding environment. The mounting arm 130 is preferably constructed from a high temperature thermal plastic and provides added protection for a robot during a crash, because the plastic can break or fracture if the crash is severe or the collision sensor fails, thus saving damage to the typically expensive welding robot. In one embodiment the integrated robotic mounting arm can take the place of a collision sensor if the break point were specified in design, thus lowering the cost of a robotic torch system by eliminating the expense of the collision sensor.

The welding robot mounting sleeve 134 is preferably positioned on the end of the arm section 136 opposite the welding torch mounting sleeve 132. As shown in FIG. 6, the welding robot mounting sleeve preferably has a hollow cross section with a keyed interior circumference 152 for connecting with a robotic collision sensor post. The keyed interior circumference may have a flattened portion 153 or other shape to orient the welding robot mounting sleeve 134 in a desired orientation when attached.

Preferably, a quick change knob 154 is used to secure the keyed interior circumference 152 to a robotic collision sensor post 159 as shown in FIG. 5. which facilitates the easy replacement of the robotic torch or separate components within the system. In a preferred embodiment, a user may fasten or loosen the integrated robotic mounting arm 130 to a collision sensor 160 by hand. The quick change knob includes a handle 156 and a threaded portion 158. The threaded portion 158 may be screwed into the threaded portion 162 of the collision sensor post 159 to removably attach the integrated robotic mounting arm. The flattened portion 153 of the keyed interior circumference is designed to receive a complementary flattened exterior portion of the collision sensor post. A preferred collision sensor is a QUICKSTOP collision sensor manufactured by Applied Robotics.

A preferred method of assembling a robotic torch is to fasten a cable fitting to the conductive inner body tube via a power adapter. Appropriate power adapters, selected based on the type of cable assembly to be used, are available from DovaTech, Ltd. of Beecher, Ill. Once a cable fitting has been fastened to the inner body tube, the locking mechanism is installed. The sections of the lock ring are placed in the recessed areas of the inner body tube and power adapter and the lock ring bushing is positioned over the lock ring. The next step in the assembly process is to load, from the front, the wave spring and rear housing. The wave spring in this assembly provides tension and prevents the components from sliding back and forth once the robotic torch is assembled.

The next step is to install the rear housing retaining ring in the annular groove located approximately midway along the inner body tube. The retaining ring axially secures the rear housing and locking mechanism. External snap ring pliers, available from Truarc, Inc. and other snap ring manufacturers, may be use to remove and install the retaining ring. At this point, a robotic mount or an integrated robotic mounting arm can be assembled onto the robotic torch depending upon the application requirements. Regardless of whether a robotic mount or integrated robotic mounting arm is used, the addition of the robotic mount retaining ring in the annular groove of the second receiving area completes the assembly of components around the inner body tube.

The robotic mount retaining ring retains the robotic mount or integrated robotic mounting arm in place by loading it against the rear housing. The removable, keyed body tube 12 can then be installed. The roll pin and keyway are aligned and the locking nut threaded into the inner body tube. The presently preferred dual snap ring design allows for the robotic mount or the integrated robotic mounting arm to be quickly removed or changed without complete disassembly of the Robotic Torch. The fixed grooves and low profile aspect of the retaining rings improve the accuracy of assembly and reduce the likelihood of accidentally shearing off one of the retaining rings during use.

From the foregoing, an improved robotic MIG welding torch assembly has been described. The welding torch assembly includes a keyed body tube connected to a conductive inner body tube having a robotic mount and rear housing slidably removable from the inner body tube. First and second retaining rings allow for partial or total disassembly of the welding torch by hand. Additionally, the keyed body tube is removable by hand and includes a keyway for cooperating with a key in the inner body tube to allow only one orientation of assembly. Alternatively, an integrated robotic mounting arm has been disclosed that may be used in place of the disclosed robotic mount. The integrated mounting arm includes a keyway for positively aligning the arm in a repeatable predetermined orientation.

A method of assembly of a robotic welding torch has been described requiring minimal tools. A keyed body tube may be removed by hand allowing access to a robotic mount, or integrated robotic mounting arm, and rear housing by removal of a robotic mount retaining device and a rear housing retaining device positioned along a conductive inner body tube. This configuration is useful for quick and efficient assembly and disassembly of robotic MIG welding torches.

It is intended that the foregoing detailed description be regarded as illustrative rather than limiting, and that it be understood that the following claims, including all equivalents, are intended to define the scope of this invention.

We claim:

1. A robotic welding torch assembly for use in robotic welding, said torch assembly comprising:
    a conductive inner body tube having a first receiving area for receiving a rear housing retaining device and a second receiving area for receiving a robotic mount retaining device; and
    a removable robotic mount slidably positioned over the conductive inner body tube, said robotic mount held in a fixed axial position by the robotic mount retaining device on one end and a rear housing on the other end.

2. The welding torch assembly of claim 1, wherein the first and second receiving areas are circumferential grooves in an external portion of the inner body tube.

3. The welding torch assembly of claim 1, wherein the rear housing retaining device is a snap ring.

4. The welding torch assembly of claim 1, wherein the robotic mount retaining device is a snap ring.

5. The welding torch assembly of claim 1, wherein the conductive inner body tube further comprises a female connector end for receiving a removable keyed body tube.

6. The welding torch assembly of claim 5, wherein the female connector end in the inner body tube designed to receive the detachable keyed body tube further comprises a key for cooperating with a keyway in a male connector end of the keyed detachable body tube whereby a keyed connection is formed in a predetermined orientation when the keyed body tube is attached to the inner body tube.

7. The welding torch assembly of claim 1, wherein the robotic mount comprises a cylindrical outer circumference and a non-circular inner circumference.

8. The welding torch assembly of claim 7, wherein the non-circular inner circumference is hexagonal.

9. The welding torch assembly of claim 1, wherein the robotic mount comprises an electrically insulating material.

10. The welding torch assembly of claim 9 wherein the electrically insulating material is a thermal set plastic.

11. The robotic welding torch assembly of claim 1 wherein the welding torch assembly is a metal inert gas (MIG) welding torch assembly.

12. A robotic welding torch assembly for use with a welding robot, said torch assembly comprising:
    a conductive inner body tube attached to a cable assembly, said conductive inner body tube having a first receiving area for receiving a rear housing retaining device and a second receiving area for receiving a robotic mount retaining device; and a removable integrated robotic mounting arm positioned over the conductive inner body tube, said integrated robotic mounting arm having a torch mounting sleeve, an arm section, and a welding robot mounting sleeve;

said torch mounting sleeve held in a fixed axial position by the robotic mount retaining device on one end and the rear housing on the other end.

13. The welding torch assembly of claim 12, wherein the arm section extending perpendicularly from the torch mounting sleeve.

14. The welding torch assembly of claim 12, wherein the arm section comprises a T-shaped cross-section.

15. The welding torch assembly of claim 12, wherein the welding robot mounting sleeve comprises a hollow cylindrical portion integrally formed with said arm and positioned on an end of the arm section opposite the torch mounting sleeve, whereby the integrated robotic mounting arm is attachable to a robotic collision sensor post.

16. The welding torch assembly of claim 12, wherein the welding robot mounting sleeve further comprises a keyed cross-section having a flattened portion for receiving a collision sensor post in a predetermined orientation.

17. The welding torch assembly of claim 12 wherein the inner body tube comprises a hexagonal exterior circumference and the welding torch mounting sleeve comprises a hexagonal inner circumference, whereby an anti-rotational connection is formed.

18. The welding torch assembly of claim 12, wherein the inner body tube further comprises a key for cooperating with a keyway in the welding torch mounting sleeve of the integrated robotic mounting arm.

19. A removable integrated robotic mounting arm for use in a robotic welding torch assembly comprising:

a torch mounting sleeve having a non-circular inner circumference configured to directly contact a conductive inner body tube having a complementary non-circular outer circumference, wherein the non-circular inner circumference forms an anti-rotational fit against the complementary non-circular outer circumference of the conductive inner body tube;

an arm section integrally attached to the torch mounting sleeve and extending perpendicularly from the torch mounting sleeve; and a welding robot mounting sleeve integrally attached to the arm section opposite the torch mounting sleeve.

20. The integrated robotic mounting arm of claim 19, wherein the torch mounting sleeve further comprises a keyway positioned on the inner circumference.

21. The integrated robotic mounting arm of claim 19, wherein the arm section comprises a T-shaped cross-section.

22. A method of assembling a robotic welding torch assembly comprising the steps of:

attaching a cable fitting to a conductive inner body tube via a power adapter;

sliding a biasing member and rear housing over the front end of the conductive inner body tube, wherein the biasing member is positioned between the power adapter and the rear housing;

installing a rear housing retaining member in a first receiving area located along the inner body tube wherein the biasing member is partly compressed in an axial direction by the rear housing, whereby the rear housing is maintained in an axial position along the inner body tube between the rear housing retaining member and the partly compressed biasing member.

23. The method of claim 22, further comprising the steps of sliding a robotic mount over the inner body tube until it makes contact with the rear housing; and installing a robotic mount retaining member in a second receiving area along the inner body tube to maintain the robotic mount in an axially fixed position, wherein the robotic mount is biased against the robotic mount retaining member by the biasing member, said robotic mount individually removable from the inner body tube.

24. A robotic welding torch assembly for use in robotic welding, said torch assembly comprising:

a conductive inner body tube having a first receiving area for receiving a rear housing retaining device and a second receiving area for receiving a robotic mount retaining device; and a removable robotic mount slidably positioned over the conductive inner body tube, said robotic mount held in a fixed axial position by the robotic mount retaining device on one end and a rear housing on the other end, wherein the robotic mount comprises a cylindrical outer circumference and a polygonal inner circumference.

25. A robotic welding torch assembly for use with a welding robot, said torch assembly comprising:

a conductive inner body tube attached to a cable assembly, said conductive inner body tube having a first receiving area for receiving a rear housing retaining device and a second receiving area for receiving a robotic mount retaining device, wherein the inner body tube comprises a polygonal exterior circumference;

a removable integrated robotic mounting arm positioned over the conductive inner body tube, said integrated robotic mounting arm having a torch mounting sleeve, an arm section, and a welding robot mounting sleeve; and said torch mounting sleeve held in a fixed axial position by the robotic mount retaining device on one end and the rear housing on the other end, the torch mounting sleeve comprising a polygonal inner circumference designed to form an anti-rotational connection with the polygonal exterior circumference of the conductive inner body tube.

* * * * *

UNITED STATES PATENT AND TRADEMARK OFFICE
CERTIFICATE OF CORRECTION

PATENT NO.    : 5,866,874
DATED         : February 2, 1999
INVENTOR(S)   : C. Haczynski et al.

It is certified that error appears in the above-identified patent and that said Letters Patent is hereby corrected as shown below:

Title page,
Item [21], delete "633,336" and substitute -- 08/633,336 -- in its place.
Under "OTHER PUBLICATIONS", delete "1993" and substitute -- 1996 -- in its place, delete "Operationa" and substitute -- Operations -- in its place, delete "Guns"Forn" and substitute -- Guns" Form -- in its place, delete "Producs" and substitute -- Products -- in its place, delete "Alezander" and substitute -- Alexander -- in its place, and delete "Alezander" and substitute -- Alexander -- in its place.

Column 2,
Line 7, delete "is" and substitute -- this -- in its place.

Column 4,
Line 23, delete "doll" and substitute -- dowel -- in its place.

Signed and Sealed this

Twenty-eighth Day of May, 2002

*Attest:*

JAMES E. ROGAN
*Attesting Officer*    *Director of the United States Patent and Trademark Office*